United States Patent
Neyer et al.

(10) Patent No.: US 12,314,098 B2
(45) Date of Patent: May 27, 2025

(54) METHOD AND APPARATUS FOR DETERMINING TEMPERATURES IN AN ELECTRIC MACHINE

(71) Applicant: Robert Bosch GmbH, Stuttgart (DE)

(72) Inventors: Daniel Neyer, Stuttgart (DE); Leon Glass, Renningen (DE); Matthias Kraenzler, Dettingen (DE); Wael Hilali, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 18/299,631

(22) Filed: Apr. 12, 2023

(65) Prior Publication Data

US 2023/0333614 A1    Oct. 19, 2023

(30) Foreign Application Priority Data

Apr. 13, 2022  (DE) .................... 10 2022 203 727.8

(51) Int. Cl.
*G06F 1/00* (2006.01)
*G06F 1/20* (2006.01)
*G06N 3/045* (2023.01)
*G06F 1/3203* (2019.01)

(52) U.S. Cl.
CPC ............. *G06F 1/206* (2013.01); *G06N 3/045* (2023.01); *G06F 1/3203* (2013.01)

(58) Field of Classification Search
CPC ........ G06F 1/206; G06F 18/214; G06F 30/27; G06F 2119/08; G06N 3/045; G06N 3/044; G06N 3/08; H02P 29/66; H02P 29/60

USPC .......................................................... 713/300
See application file for complete search history.

(56) References Cited

U.S. PATENT DOCUMENTS

| 10,733,350 B1* | 8/2020 | Prasad .................. G06F 30/327 |
| 11,631,138 B2* | 4/2023 | Fresa ..................... G06Q 40/06 |
| | | 713/300 |
| 12,008,295 B2* | 6/2024 | Junginger ........... B60R 16/0231 |
| 2011/0181217 A1* | 7/2011 | Vollmer ................ H02P 29/662 |
| | | 318/400.21 |
| 2014/0100800 A1* | 4/2014 | Prats Mustaros ..... F03D 7/0224 |
| | | 702/60 |

(Continued)

FOREIGN PATENT DOCUMENTS

DE    10 2015 226 076 A1    6/2017
DE    10 2019 101 163 B3    6/2020

(Continued)

OTHER PUBLICATIONS

Langtangen et al., "Scaling of Differential Equations", Simula Springer Briefs on Computing, vol. 2, pp. 1-149, 2016 (149 pages).

*Primary Examiner* — Volvick Derose
(74) *Attorney, Agent, or Firm* — Maginot, Moore & Beck LLP

(57) ABSTRACT

A method for determining a temperature of a component of an electric machine includes providing a plurality of trained neural networks, providing a current measurement of a plurality of operational parameters of the electric machine, and processing the operational parameters using the neural networks. The method further includes integrating output parameters issued by the neural networks over a time period, and issuing the integrated parameters as a temperature of the component.

6 Claims, 3 Drawing Sheets

(56) References Cited

U.S. PATENT DOCUMENTS

| | | | | |
|---|---|---|---|---|
| 2019/0296644 A1* | 9/2019 | Huang | .................... | G06F 1/26 |
| 2020/0081464 A1* | 3/2020 | Balma | ................ | G05D 23/1934 |
| 2020/0134461 A1* | 4/2020 | Chai | ..................... | G06N 3/084 |
| 2020/0334537 A1* | 10/2020 | Yao | ........................ | G06N 3/045 |
| 2022/0026286 A1* | 1/2022 | Reith | ..................... | G01K 13/08 |
| 2022/0066484 A1* | 3/2022 | Warren | ................. | G05D 23/32 |
| 2023/0049089 A1* | 2/2023 | Cheng | ..................... | H02J 3/003 |
| 2023/0222270 A1* | 7/2023 | Deeg | ...................... | G06F 30/27 |
| | | | | 703/6 |
| 2023/0237211 A1* | 7/2023 | Tong | ....................... | G06F 30/27 |
| | | | | 703/7 |
| 2023/0281472 A1* | 9/2023 | Asghari | ................ | G06N 20/20 |
| | | | | 706/12 |
| 2024/0159844 A1* | 5/2024 | Klein | ................ | G05B 23/0283 |

FOREIGN PATENT DOCUMENTS

| | | |
|---|---|---|
| DE | 10 2019 202 235 A1 | 8/2020 |
| DE | 10 2020 214 228 A1 | 5/2022 |
| EP | 2 318 818 B1 | 9/2016 |
| WO | 2010/009984 A1 | 1/2010 |

\* cited by examiner

METHOD AND APPARATUS FOR DETERMINING TEMPERATURES IN AN ELECTRIC MACHINE

This application claims priority under 35 U.S.C. § 119 to patent application no. DE 10 2022 203 727.8, filed on Apr. 13, 2022 in Germany, the disclosure of which is incorporated herein by reference in its entirety.

The disclosure relates to a method for determining a temperature of a component of an electric machine by means of neural networks. The disclosure further relates to an apparatus and a computer program which are configured to perform the method. In particular, the disclosure relates to electric machines used in hybrid vehicles, electric vehicles, or fuel cell vehicles.

BACKGROUND

For electric machines, in particular in the automotive field, the determination of the rotor temperature is of particular importance in order to avoid demagnetization of the rotor magnets in the event of overheating as well as consequences derived therefrom, e.g., premature derating. However, measurement using temperature sensors is difficult when sensing the rotor temperature. As a result, the rotor temperature of the electric machine is usually determined using physical modeling, which is also true of the stator. Given that stator access using physical sensors is relatively simple, the stator temperature has often been determined using a specific hardware sensor. This solution is undesirable due to the costs associated with the manufacture and installation of this sensor. As a result, much effort has recently been made to replace this physical sensor with a virtual sensor, i.e., a model that maps some otherwise accessible machine measurement data to an estimate of stator temperature.

One exemplary method for determining a rotor temperature is known from DE 10 2020 214 228.

It is desirable to be able to evaluate the used data-based models for rotor/stator temperature measurement, which are mostly blackbox models, with regard to their stability or even to be able to guarantee a stability of the data-based models, which is critical for safeguarding.

One object of the disclosure is to compensate for the lack of evidence of stability in the models used for temperature estimation.

SUMMARY

The disclosure has the following advantages. First, prior physical knowledge can be directly incorporated so that the inventive hybrid models are reduced in terms of complexity. This also means that smaller models are sufficient in order to reliably determine the temperatures. This reduction can be extremely important when using models for embedded systems.

Second, the inventive hybrid model reliably excludes some physically implausible behaviors. In particular, the overall model, regardless of the weights of the statistical submodels trained, will never predict that heat is flowing from cooler to warmer bodies, that the engine is cooled by power losses, or that the components of the engine are isolated from each other.

Third, the inventive hybrid model features input-to-state stability (ISS). Essentially, this means that finite inputs to the model will result in finite model outputs for all time points. It is sufficient at this point to say that ensuring ISS is valuable in securing a model. Furthermore, common safety tests are complex, e.g., monitoring the output of the model or testing the model over a large number of usage cycles for stability detection.

One way to address the task is to apply the laws of thermodynamics in order to derive a physical model for that system. If the first principle of thermodynamics is applied, a general model can be defined as follows:

$$\dot{T}_{stator} = P_{loss} + g_c(T_c - T_s) + g_r(T_r - T_s) \quad \text{(Eq. 1)}$$

wherein $P_{loss}$ are power losses in the stator, and $g_c$ and $g_r$ are the thermal conductivities from the stator to the coolant ($g_c$) or to the rotor ($g_r$). It is thereby assumed that the stator interacts with the rotor and the coolant only through convection. Convection with other bodies can be considered by adding additional convection terms.

It is understood that both the power losses and the thermal conductivity will change, depending upon the operating conditions of the engine. They can be adequately modeled by functions that take into account the various electrical and mechanical operating conditions of the engine given by a vector:

$$u_{el,mech} = [i_d, i_q, i_{eff}, u_{inv}, n, q_c] \quad \text{(Eq. 2)}$$

Wherein n is a rotational speed, $q_c$ is a coolant mass flow rate, $i_d$, $i_q$ are motor currents, $i_{eff}$ is an effective motor current, and $u_{inv}$ is an inverter voltage. Preferably, the vector also comprises a pulse width modulation frequency $f_{pwm}$.

Despite the ease with which this simple model can be formulated, it proves difficult to design it to include appropriate functions for $P_{loss}$, $g_c$ and $g_r$.

In a first aspect of the disclosure, substantially a new architecture is proposed for the models based on neural ordinary differential equations (NODE).

This approach allows the right-hand-side (RHS) of an ordinary differential equation to be determined using one or more parametric models, e.g. neural networks, and to train these models.

The ability to specify the RHS of a differential equation through the free combination of neural networks and mechanistic equations provides great flexibility in designing hybrid models of dynamic systems. To make this usable for the present modeling problem of stator temperature modeling, (Eq. 1) can be extended with the help of neural networks:

$$\dot{T}_{stator} = NN_{loss}(u_{el,mech}) + NN_c(g_c)(T_c - T_s) + NN_{rotor}(n)(T_r - T_s) \quad \text{(Eq. 3)}$$

In this case, the unknown functions $P_{loss}$, $g_c$, and $g_r$ were replaced by neural networks. In the following, architectures for the neural networks are chosen which exclude a non-physical behavior.

With respect to the power losses, it can be defined that whenever the machine is idle, losses are equal to 0:

$$NN_{loss}(u_{el,mech} = 0) = 0 \quad \text{(Eq. 4)}$$

In addition, losses should never cool the machine, i.e.:

$$NN_{loss}(u_{el,mech}) > 0 \quad \text{(Eq. 5)}$$

Given both Eq. 4 and Eq. 5, for $NN_{loss}$ the following is proposed:

$$NN_{loss}(u_{el,mech}) = \text{relu}(NN_1(u_{el,mech}) - NN_1(0)) \quad \text{(Eq. 6)}$$

Preferably, $NN_1$ is a densely connected neural network.

It has been found that Eq. 6 can be adjusted in order to yield more precise results as follows:

$$NN_{loss}(u_{el,mech}, T_s, T_c) = \|NN_1(u_{el,mech}, T_s, T_c) - NN_1(0, T_s, T_c)\|$$

wherein $T_s$, $T_c$ are stator and coolant temperatures. In other words, the loss model fundamentally can comprise more inputs, and the inputs preferably characterize no states.

The following applies to thermal conductivities: Heat should always flow from a warmer body to a cooler body, i.e.:

$$NN_c(q_{cool}) > 0$$

$$NN_{rotor}(n) > 0 \quad \text{(Eqs. 7)}$$

Given the geometry of electric motors, it is not possible to perfectly isolate the components from each other, which can be considered as follows:

$$NN_c(q_{cool}) > a$$

$$NN_{rotor}(n) > a \quad \text{(Eqs. 8)}$$

wherein $a > 0$. Preferably, $a = 10^{-5}$ is selected.

It is proposed that this be ensured by way of appropriate model architectures:

$$NN_c(q_{cool}) = a + \text{relu}(NN_2)$$

$$NN_{rotor}(n) = a + \text{relu}(NN_3) \quad \text{(Eqs. 9)}$$

Note that, instead of relu(·), other functions can be used which fulfill the property of Eq. 7. Particularly preferable is using a quantity function $\|\cdot\|$ which outputs a positive quantity for the output of $N_1$, $NN_2$. In contrast to relu(·) the quantity function has the advantage that more precise gradients can be derived. So, using the quantity function, $NN_1$, $NN_2$ can be better trained and more precise models can be achieved as a result. Stated more precisely, the advantage is that ReLU will always lead to gradient 0 by way of its plateau for $x < 0$, whereas the quantity function does not have this disadvantage.

Regarding the neural networks $NN_i$, $i = 1.2.3$, densely connected neural networks can be used which are activated by the ReLu activation function. This choice has the advantage that an ISS stability can be achieved. It is noted that this stability is obtained for all stepwise linear functions in the loss model. The thermal conductivities can be modeled using any model, preferably a physical model.

Based on the aforementioned approach, a temperature of a component of an electric machine can then be determined using the steps discussed in the following. An electric machine can be understood to mean a machine that is a form of energy converter. In particular, the electric machine is a rotating electric machine, such as an electric motor or an electric generator, or a stationary electric machine, e.g., a transformer. In one preferred embodiment, the electric machine is an electric motor comprising, as components, a stator, a rotor, and/or an armature.

The method begins by providing a plurality of trained neural networks. A first neural network of the plurality of trained neural networks is configured to determine power losses of the component. A second neural network is configured to determine thermal conductivity between the component and the coolant. A third neural network is configured to determine thermal conductivity between the component and an adjacent further component of the electric machine. Note that, if a plurality of further components are to be considered, a neural network for determining the power loss as well as a further neural network for determining the thermal conductivities between the individual components can be provided for each of the components.

Thereafter, a current measurement of a plurality of operational parameters of the electric machine is provided.

Processing of the operational parameters by means of the neural networks then follows. The operational variables can include:

at least one current of the electric machine, at least one voltage of the electric machine, a DC link voltage of a battery coupled to the electric machine, an effective phase current of the electric machine, a pulse width modulation frequency, a speed of the electric machine, a torque of the electric machine, at least one modulation parameter of the electric machine, an ambient temperature of the electric machine, and/or a transmission temperature of a transmission coupled to the electric machine.

The next step is to integrate the operational parameters issued by the neural networks over a time period with respect to a temperature of the component. Note that output parameters of the neural networks determined via one or a plurality of immediately preceding measurements can additionally also be integrated.

In a further aspect, the disclosure relates to a training method for training the plurality of the neural networks.

In further aspects, the disclosure relates to an apparatus and to a computer program, which are each configured to perform the aforementioned methods, and to a machine-readable storage medium on which said computer program is stored.

BRIEF DESCRIPTION OF THE DRAWINGS

Embodiments of the disclosure are explained in greater detail below with reference to the accompanying drawings. In the drawings.

DETAILED DESCRIPTION

Figure 1:
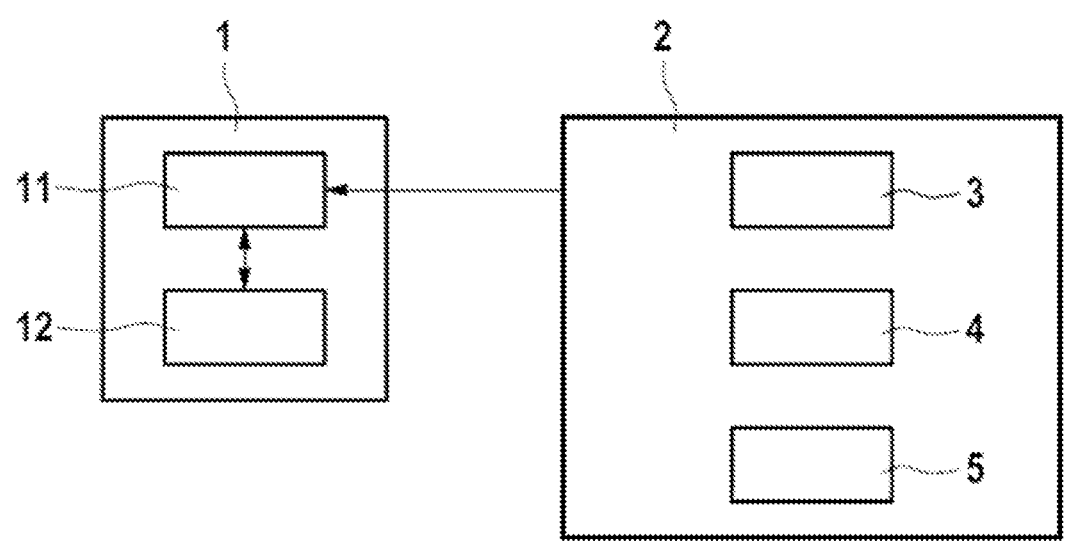
FIG. 1 is a schematic block diagram of an electric machine.

FIG. 1 shows a schematic block diagram of an electric machine 2 as well as an apparatus 1 for determining a temperature of a rotor 3 of the electric machine 2. The electric machine 2 further comprises a stator 4 and a coolant reservoir 5.

The apparatus comprises an interface 11 and a computing means 12. The interface 11 is preferably wired, but it can also be a wireless interface. The computing means 12 comprises memory for storing the received data as well as computing components, e.g., microprocessors, application-specified circuitry (ASICs), or the like.

Input parameters dependent on the operation of the electric machine are received via the interface 11. The input parameters include physical or mechanical parameters (e.g., temperatures, a torque, an RPM, and the like) and/or electrical parameters (e.g., currents and the like), preferably parameters for the vector $u_{el,mech}$ according to Eq. 2.

The computing means 12 calculates a temperature of the stator 4 and/or rotor 3 of the electric machine 2 based on at least one input parameter (e.g., the temperature of the stator 4 and the temperature of the coolant 5) using data-based models.

The calculated temperature can be issued via the interface 11. For example, a control device can receive the calculated temperature of the rotor 3, and preferably depending on the calculated temperature controlling the electric machine.

The disclosure is based on neural ordinary differential equations (NODE) to determine the data-based models. As already mentioned, the architecture of a NODE is simply given by the RHS of an ordinary differential equation using one or more neural networks (other models trainable by means of gradient descent are possible). The predictions by this model are then the numerical solutions of the initial value problem (IVP), which is solved using said ODE and a series of initial conditions.

Gradient calculations in relation to numerical solutions of IVPs are referred to in the literature as "sensitivity analysis". There are several ways to automatically calculate these gradients. In short, the sensitivity analysis solves the problem by reducing it to the solution of a second IVP that is solved backward in time. The underlying mathematical mechanism enabling this was developed by Pontryagin under the name "adjoint sensitivity analysis". In addition to said adjoint sensitivity method, it is also possible to calculate gradients for NODE by applying automatic differentiation in forward or reverse mode to the operations of the numerical solver, which can have numerical advantages over the adjoint sensitivity method.

Application of the above NODE model to a physical electric motor system requires training of the neural networks used in the NODE. Doing so requires a training software routine, which is often referred to as a pipeline.

As an input, a training pipeline requires measurement series of all features or control inputs, as well as labels or states of the NODE model. Regarding the design of the experiments, known measurement methods can be used which lead to an information-rich body of measurement series.

The data can then be preprocessed in order to create suitable conditions for training a NODE model. The preprocessing for the training of a NODE model can be performed as done in the better known recurrent neural networks (RNNs).

Measurement series come from physical sensors, i.e., depending on the quality of the sensors, different sensor noise is to be expected. The sensor noise can be removed with low pass filters. In particular, care must be taken to avoid a causal filtering as this implies the use of future readings, thus eliminating the option of operating the model in real time.

Advantageously, standardization of each individual measurement series to a mean of 0 and to a standard deviation of 1. This can reduce numerical training issues. Additionally or alternatively, a scaling in the time axis can be performed, wherein the time periods between the individual measurement operations are effectively scaled in this case. The scaling process can be performed as disclosed in Langtangen, Hans Petter, and Geir K. Pedersen. Scaling of differential equations. Springer Nature, 2016, such that states x and their derivative dx are approximately the same order of magnitude. The ODE is then well conditioned. Preferably, the scaling process is performed as follows: Training the model without time scaling. Using a histogram, checking if x and dx (x point) are on the same order of magnitude. If not, scaling the time so that it is approximate. Retraining the model using a scaled time and reviewing the aforementioned histograms.

Measurements of an electric motor using measurement campaigns typically exhibit long measurement series ranging from a few minutes to several hours. This is true because realistic usage cycles, particularly in automotive applications, comprise such time scales. The use of very long time series in training a NODE is disadvantageous because the model predicts a time series incrementally, and the errors accumulate over time. If the parameters of our model are poorly set (which is necessarily the case at the start of the training), then many successive erroneous predictions can accumulate and destabilize the training process. To avoid this, the training data can be broken into smaller windows of equal length. The window length can be considered as a hyperparameter. It has been found that a parameter window of 100 seconds leads to good results.

After partitioning the data into windows, stacks of windows are formed to train the NODE model by stochastic gradient descent. In this way, training stacks are achieved in the form of three-dimensional tensors having a feature/label dimension, a time dimension, and a stack dimension. The dataset can then be divided into a training dataset and validation dataset. The training dataset is used to adjust the weights of the network, and the validation dataset is used to control the learning rate and premature stopping. In order to test the performance of the final model, a separate test dataset with full cycles of use of the electric motor containing a much longer time series is preferably maintained. This makes sense because ultimately the freewheeling performance of the model is relevant, and gradient updates are not enabled.

After the data has been prepared as described above, the training of the model will proceed. Training is organized similarly to neural network training. The model is trained for a series of epochs, wherein each epoch uses each batch of training data exactly once in order to update the weighting of the neural networks. To update the weights of the neural networks, predictions are made for the current training stack by using a numerical solver to release the IVP associated with the NODE and the initial value of the training stack.

Regarding the stator temperature modeling problem, the stator temperature is provided as a hidden state. This temperature can be initialized with the first time step of the label series since the stator temperature is both the hidden state and the label. Other initialization methods must be used for models with hidden states that cannot be measured. The unmeasured states could simply be initialized to zero.

The gradients related to the solution of the IVP are calculated using any of the above methods, including automatic forward or reverse differentiation of the numerical solver (also known as "discretize-optimize"), or one of the various methods based on the adjoint sensitivity method (also known as "optimize-discretize").

After using each staple of the training data to update the gradients, the performance of the model is reviewed for the validation quantity. This procedure is performed in order to decrease the optimization step parameter or end the training when the validation loss ceases to decrease.

After the training process, a performance capability of the model can be determined on a further test dataset.

Figure 2:
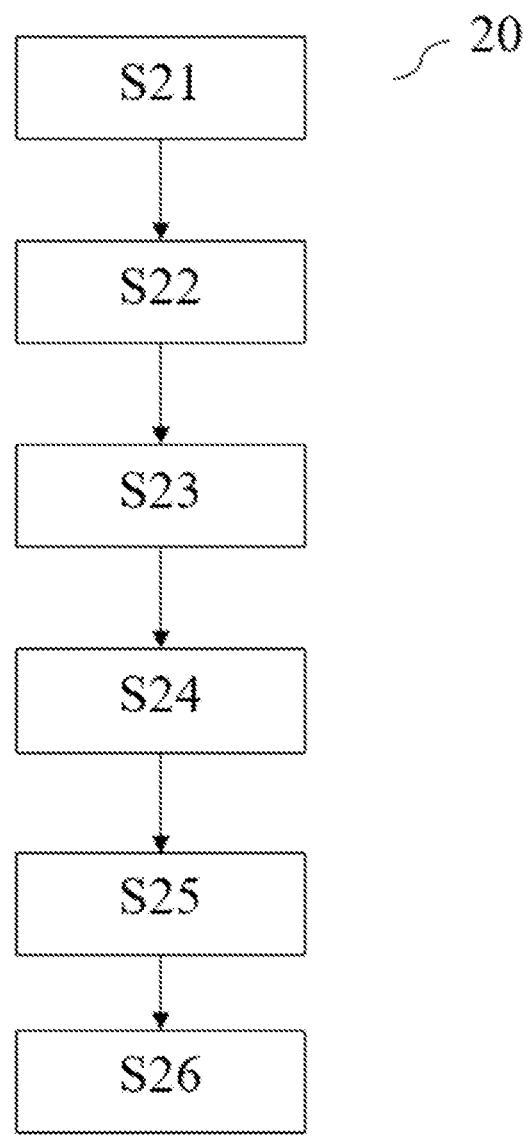
FIG. 2 schematically illustrates a flow chart of one embodiment of the disclosure.

FIG. 2 schematically shows a flow diagram 20 of an embodiment of a method for teaching or training the neural networks. as well as operating the neural networks as a virtual sensor for a temperature determination in the electric machine.

The method starts with step S21. In this step, the preprocessing of the training data discussed above is performed.

Step S22 is then performed. In this step, the neural networks $NN_i$, i=1.2.3 are initialized according to the above equations, Eqs. 4-9.

Step S23 then follows. In this step, the neural networks initialized from step S22 are trained in accordance with NODE. Training can be performed using either gradients as explained above, by means of an adjoint sensitivity method, or by means of another solver.

When the training process is complete after step S23, step S24 can follow. The neural networks are thereby validated after step S23.

Step S25 optionally then follows. In this step, depending on the final hardware on which the models obtained after step S23 are to be executed, compression and optimization of the models with respect to the final hardware is performed. In other words, in step S25 a deployment is performed.

Then, optionally, step S26 follows. In this step, the obtained models are used from either step S23, S24, or S25.

Use of the models can proceed as follows. An initialization parameter is first determined. The initialization parameter can be an ambient temperature of the electric machine, or it can be determined using a cooling curve or other initialization methods.

The models are then applied to the initialization parameter and, at predetermined times, parameters for the vector $u_{el,mech}$ on the electric machine are determined, as well as processed by the models. In this case, the RHS of equation Eq. 3 is calculated each time in order to obtain a current value for the $\dot{T}_{stator}$.

Regarding the previously interacting $\dot{T}_{stator}$ the current value $\dot{T}_{stator}$ is integrated in order to obtain a current temperature.

The calculated temperature is issued and considered by a control device when controlling the electric machine 3. In particular, the determined temperature can be considered in a derating method.

Note that the method can be easily adapted to other thermal systems, wherein the ISS property is retained. For example, Eq. 1 can generally be extended as follows:

$$\dot{T}=\Sigma_i^N f_i(u)+\Sigma_j^K g_j(T,u)(t^\theta-T) \quad \text{(Eq. 10)}$$

Wherein, $f_i(\cdot)$ are individual power loss models, $g_j(\cdot)$ are thermal conductivity models, and $t^\theta$ is a subset representing the temperature of an adjacent body with which the system exchanges heat. The first sum combines N various loss terms together, while the second sum describes heat exchange with K adjacent bodies. In order that the ISS property is maintained, the models are created according to equations (Eq. 6) and (Eq. 9).

In particular, the method can be minimally adjusted in order to model the rotor temperature of the electric motor rather than the stator temperature. The only necessary adjustment thereby is switching the variables for stator temperature and rotor temperature: The rotor temperature becomes the state of the NODE, and the stator temperature becomes an input.

Figure 3:
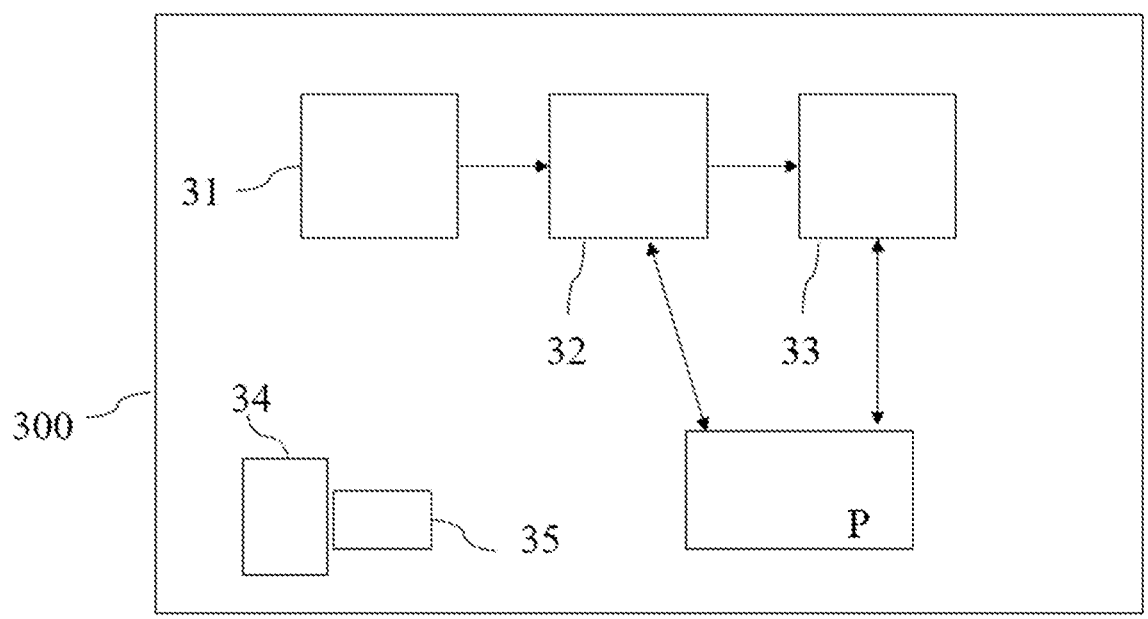
FIG. 3 schematically illustrates a training apparatus.

FIG. 3 schematically shows a training apparatus 300 comprising a provisioner 31 that provides individual training data from a training dataset. The individual training data are fed to the neural network being trained, which will determine output parameters on this basis. Output parameters and training data are fed to an evaluator 33, which determines updated (hyper-)parameters on this basis, which are transmitted to the parameter memory P and replace the current parameters in said memory. The evaluator 33 is configured to perform steps S23 of the method shown in FIG. 2.

The methods performed by the training apparatus 300 can be stored and implemented as a computer program on a machine-readable storage medium 34 and can be executed by a processor 35.

The term "computer" includes any device used for processing predeterminable calculation rules. These calculation rules can be present in the form of software, in the form of hardware, or also in a mixed form of software and hardware.

What is claimed is:

1. A method for determining a temperature of a component of an electric machine, comprising:
providing a plurality of trained neural networks;
determining power losses of the component using a first neural network of the plurality of trained neural networks;
determining a thermal conductivity between the component and coolant using a second neural network of the plurality of trained neural networks;
determining a thermal conductivity between the component and an adjacent further component of the electric machine using a third neural network of the plurality of trained neural networks;
providing a current measurement of a plurality of operational parameters of the electric machine;
processing the plurality of operational parameters using the plurality of trained neural networks;
integrating output parameters output by the plurality of trained neural networks over a predetermined period of time; and
issuing the integrated output parameters as the determined temperature of the component,
wherein the first neural network is configured to issue output parameters greater than or equal to zero for any desired operational parameters and to issue an output parameter of zero for operational parameters that do not characterize operation of the electric machine.

2. The method according to claim 1, wherein an apparatus is configured to perform the method.

3. The method according to claim 1, wherein a computer program comprises instructions which, when the computer program is executed by a computer, prompts the computer to perform the method.

4. The method according to claim 3, wherein the computer program is stored on a non-transitory machine-readable storage medium.

5. The method according to claim 1, wherein the second and third neural networks are configured to issue output parameters greater than or equal to zero.

6. The method according to claim 5, wherein a rectified linear unit ("ReLu") or quantity function is applied to the output parameters of the second and third neural networks.

* * * * *